June 22, 1937.  J. D. FERRY  2,084,729
COOKING RECEPTACLE
Filed Sept. 30, 1936  2 Sheets—Sheet 1
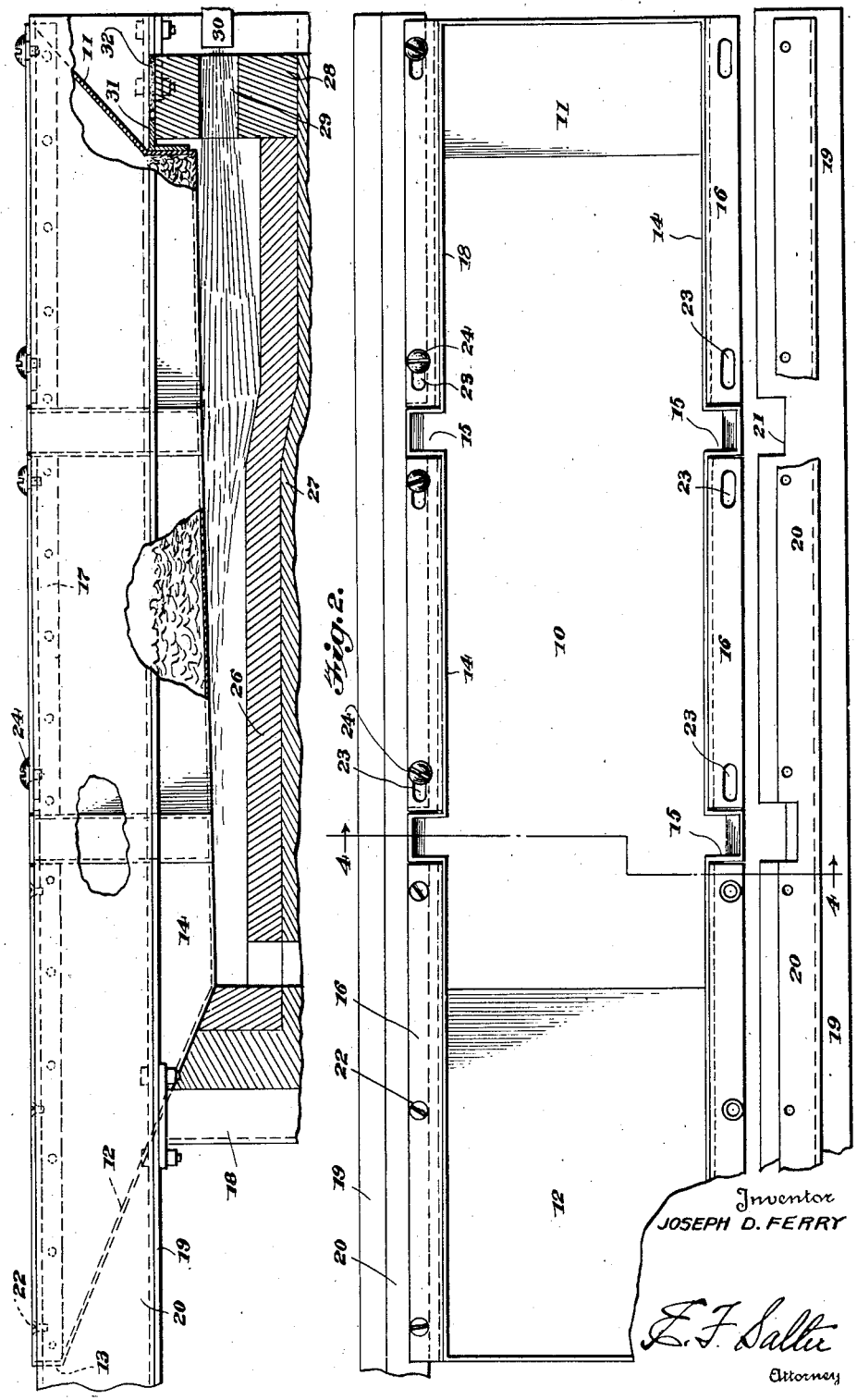
Inventor
JOSEPH D. FERRY

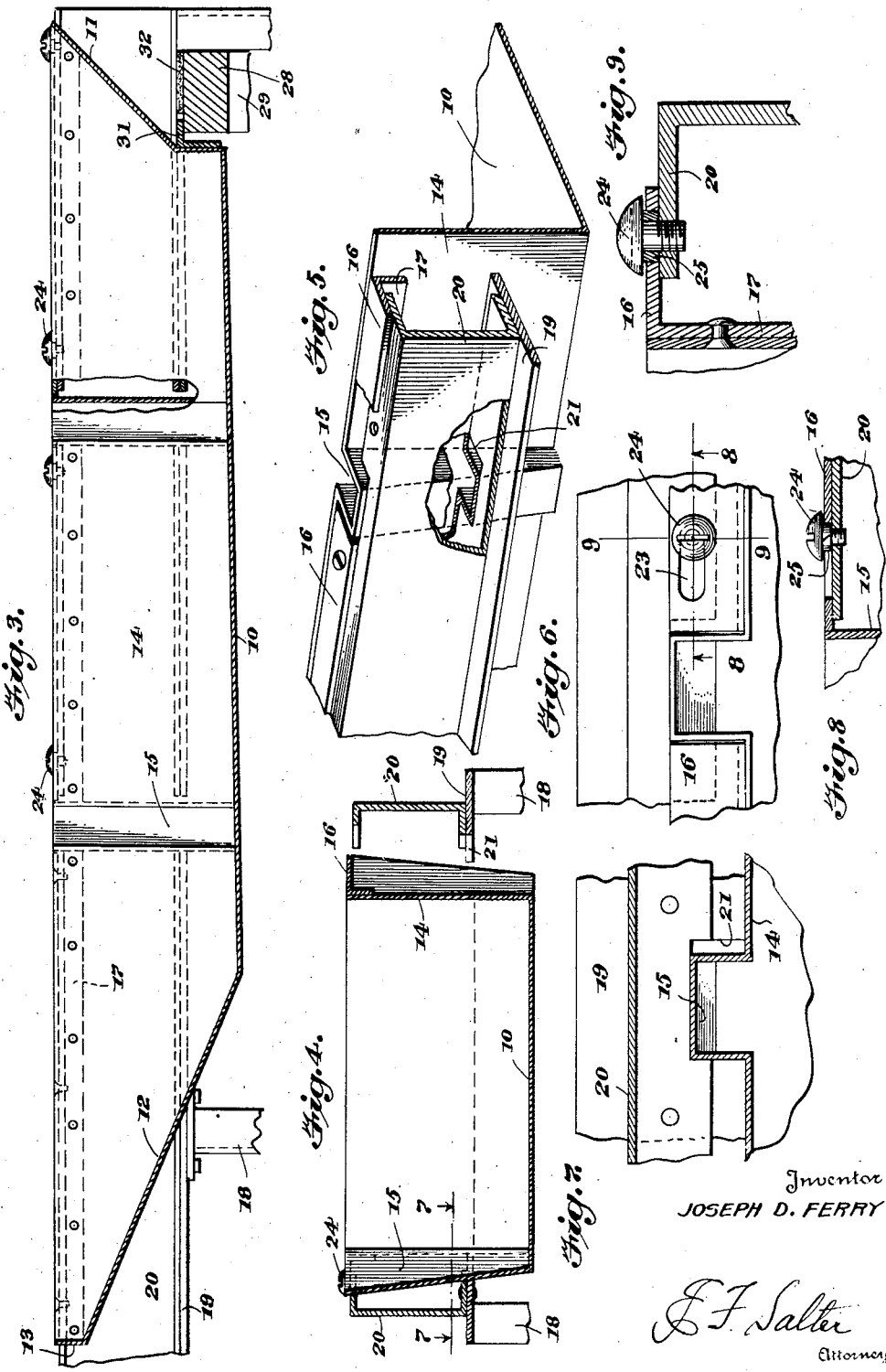

Patented June 22, 1937

2,084,729

UNITED STATES PATENT OFFICE 2,084,729

COOKING RECEPTACLE

Joseph D. Ferry, Harrisburg, Pa.

Application September 30, 1936, Serial No. 103,464

17 Claims. (Cl. 53—7)

My invention relates to improvements in cooking receptacles and more particularly to kettles of the type used for cooking potato chips or the like, although capable of other uses.

Difficulty has been experienced with the cooking receptacles of the prior art due to the unequal expansion occurring in the metal forming the receptacles. Receptacles or kettles of this type are usually partially filled with a cooking liquid which is heated to a high temperature through the application of heat to the bottom of the receptacle or kettle. As a consequence, the lower portion of the receptacle is heated to a much higher temperature than the upper portion thereof and the differential expansion thus set up results in warping, buckling and distortion of the receptacle, which frequently causes breaks and pulling of the receptacle away from its supporting connections, and also a disturbance in the relation of the kettle to the heating and other associated mechanisms. In many instances, the differential expansion has been known to cause bowing or buckling of the bottom of the kettle to such an extent that the kettle supporting legs were actually raised out of contact with the floor or other supporting surface.

An important object of my invention is the provision of a receptacle or cooking kettle constructed to accommodate unequal expansion of its various parts without buckling of the bottom of the kettle, and without subjecting the parts of the kettle to undue stresses and strains.

A further object of my invention is the provision of a novel supporting mechanism for a cooking receptacle which will securely hold the receptacle in position while permitting expansion and contraction of the parts thereof.

Another object of my invention is to provide a device of this character which is of simple construction, inexpensive to manufacture and which will have a long life free from the destructive and deteriorating stresses of the receptacles of the prior art.

Other objects and advantages of my invention will be apparent during the course of the following description.

In the accompanying drawings, which form a part of this specification and wherein like characters of reference denote like parts throughout, Figure 1 is a side elevation of a cooking kettle embodying my invention, parts being broken away and shown in section, Figure 2 is a top plan view thereof, one side of the supporting framework being shown in a position before assembly, Figure 3 is a longitudinal sectional view through the cooking receptacle, Figure 4 is a transverse sectional view taken on the line 4—4 of Figure 2, one of the supporting beams being shown spaced away from the kettle for purposes of illustration, Figure 5 is a detail fragmentary perspective view of the portion of the kettle and support adjacent one of the expansion joints, Figure 6 is a fragmentary plan view of one of the expansion joints and the adjoining portions of the kettle and support, Figure 7 is a horizontal sectional view through one of the expansion joints and the adjacent portions of the kettle and support, the view being taken on line 7—7 of Figure 4.

Figure 8 is a detail sectional view on the line 8—8 of Figure 6, and

Figure 9 is a similar view taken on the line 9—9 of Figure 6.

In the drawings, wherein for the purpose of illustration is shown a preferred embodiment of my invention, the numeral 10 designates an elongated kettle of generally rectangular shape and formed of metal. The inlet end of the kettle is provided with a rearwardly flared end wall 11 joined to the bottom of the kettle by a vertical portion. The bottom of the kettle is flat and arranged substantially horizontally while the forward or outlet end thereof terminates in a relatively long inclined portion 12 connected to the short forward end wall 13. The side walls 14 extend for the entire length of the kettle and are vertically arranged.

A suitable liquid such as oil or the like is disposed in the kettle to the depth indicated and the kettle is heated from underneath. It will be seen that the kettle will be heated to a high and even temperature to a point adjacent the upper level of the liquid due to the presence of the liquid and that the upper portion of the kettle walls will not be so highly or so evenly heated. As it is customary to rigidly secure the side walls adjacent the upper portion of the kettle to a supporting frame work, the resultant differential expansion of the upper and lower portions of the kettle subjects the kettle to severe stresses and causes buckling of the kettle bottom.

To prevent this straining and distortion of the kettle I provide the opposite side walls thereof with expansion joints arranged in transverse alignment and consisting of substantially U-shaped channels 15 extending vertically from top to bottom of the kettle walls. The expansion channels 15 may be of any desired number, but are shown as four in number, two on each side of the kettle arranged in transverse alignment. The channels 15 are so spaced as to divide the walls of the kettle into three sections, and these channels extend laterally outwardly from the kettle walls. As indicated in Figures 4 and 5, the expansion channels are deepest at their upper ends and taper to their lower ends which consequently have a depth substantially less than the upper portions of the channels.

Horizontal outwardly extending flanges or rims 16 are provided at the top of the side walls between the channels 15 by means of angle irons 17 riveted or otherwise rigidly secured to the exterior sides of the kettle walls at the top thereof. The flanges 16 may have a width equal to the depth of the channels 15 at their upper ends and extend between the ends of the kettle and the channels and between the channels.

The kettle supporting framework comprises legs 18 which may be formed from angle iron and which are connected by longitudinally extending horizontal plate members 19 which in turn support and are rigidly secured to longitudinally extending channel beams 20 of less width than plate members 19 and arranged in spaced relation with the side edges thereof. The channel beams 20 extend for the full length of the kettle 10 and are adapted to support the kettle. Any suitable form of cross members may connect the legs 18 or plates 19 to complete the supporting framework.

The flanges 16 of kettle 10 are adapted to rest upon and be secured to the beams 20 while the plates 19 are adapted to abut against the sides of the kettle in the supporting position of the framework. Notches 21 are formed in the flanges of beams 20 and in plates 19 to receive the tapered expansion channels 15 and the notches 21 have a width substantially greater than the width of channels 15, as indicated in Figures 2, 5, 6 and 7, to permit expansion and contraction of the sides of the kettle through the resiliency of the expansion channels.

It will be seen that the expansion channels 15 divide the kettle flanges 16 into three sections. The sections of the flanges 16 at the outlet end of the kettle may be rigidly secured to the channel beams 20 by means of screw bolts 22. The flange sections at the intermediate and inlet portions of the kettle are provided with elongated longitudinally extending slots 23 adapted to receive screw bolts 24 which engage the beams 20 and have large heads adapted to overlie the edges of the slots. Suitable washers 25 of metal or other appropriate material surround bolts 24 and fit within slots 23. The washers 25 have a thickness somewhat greater than the thickness of flanges 16 so that the heads of bolts 24 do not engage the flanges, and binding of the flanges is thereby prevented.

A furnace or heating chamber is arranged below the kettle and comprises a refractory hearth 26 extending the length of the bottom of kettle 10 and is backed up by suitable heat insulation 27. The refractory end wall or block 28 of the furnace chamber at the inlet end of the kettle is provided with an opening 29 through which the flame from a suitable burner 30 is adapted to project. A horizontal angle iron 31 is secured to the vertical portion of kettle wall 11 and its flange slidably rests upon the refractory wall 28. The angle iron 31 extends for the full width of the kettle to provide an additional supporting means for the inlet end thereof and also means for preventing escape of heat between the kettle and block 28, while allowing for longitudinal expansion and contraction of the kettle. Suitable plaster or the like 32 of the thickness of the flange of angle iron 31 is disposed between the plate 19 and wall 28 as shown in Figures 1 and 3.

In operation the kettle is partially filled with cooking liquid and heat applied by burner 30 or by other suitable means. When the desired temperature is reached, the cooking liquid produces a uniform high temperature in the portion of the kettle with which it is in direct contact, causing expansion thereof. The upper portion of the kettle above the level of the cooking liquid is at a lower temperature, and because of the unequal expansion in the metal of the kettle, the cooler upper portion of the kettle normally resists expansion of the hotter lower portion of the kettle. The presence of the expansion joints 15, notches 21 and elongated slots 23, however, permits this unequal expansion and contraction of the kettle without undue strains being placed on the kettle and without distortion or buckling of the kettle. The taper of the expansion joints insures a smooth and easy movement of the parts of the kettle under the forces of expansion.

While the outlet end of the kettle is shown as rigidly secured to the channel beams 20, it may obviously be provided with slots to permit relative movement where desired, or where the temperature at this end of the kettle warrants such construction.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. A cooking kettle having a bottom, side and end walls, said side walls having expansion channels, a support, and means to secure the side walls of the kettle to the support.

2. A cooking kettle having a bottom and side walls, said side walls being formed with expansion channels, a support, and means to secure the side walls of the kettle to the support while permitting relative movement of the side walls and support longitudinally of the kettle.

3. A cooking kettle having a bottom, side and end walls, a support engaging the side walls of the kettle, and there being expansion channels formed in said side walls of the kettle and extending from top to bottom thereof.

4. A cooking receptacle having a bottom and side walls, said side walls having expansion channels formed therein and extending from a point adjacent the bottom to a point adjacent the top of the receptacle, flanges secured to said side walls adjacent the upper ends thereof, and a support engaging said flanges.

5. A cooking receptacle having a bottom and side walls, said side walls having expansion channels formed therein and extending from top to bottom thereof, flanges secured to the receptacle side walls adjacent their upper ends, and a support connected to said flanges, the connection between the flanges and support permitting relative movement between these parts.

6. A cooking receptacle having a bottom and side walls, said side walls having expansion channels formed therein and extending from top to bottom thereof, supporting beams extending longitudinally of the receptacle in proximity thereto, flanges secured to the receptacle side walls, and means to slidably connect the flanges and supporting beams.

7. A cooking receptacle having a bottom and side walls and adapted to receive a cooking liquid, said side walls having expansion channels formed therein and extending from top to bottom thereof, flanges secured to the receptacle side walls, a support having a sliding connection with said flanges, and means to apply heat to the under side of said receptacle.

8. A cooking kettle of elongated form and having a bottom and side walls, said kettle being adapted to receive a cooking liquid, the side walls of the kettle having expansion joints, a support having a connection with the kettle side walls, said connection permitting free expansion and contraction of the kettle relative to the support, and means to heat the kettle.

9. A cooking kettle having a bottom and side walls, said side walls having expansion channels formed therein and extending from top to bottom thereof, the channels increasing in depth from bottom to top, and a support having a connection with the side walls of the kettle, said connection permitting free expansion and contraction of the kettle.

10. A cooking kettle having a bottom and side walls, said side walls having expansion channels formed therein, a support arranged in proximity to the side walls of the kettle, and a bolt and slot connection between the support and the side walls of the kettle.

11. A cooking kettle having a bottom and side walls, said side walls having laterally projecting expansion channels extending from top to bottom thereof, supporting beams arranged in proximity to the kettle and having notches to receive the expansion channels, said notches having a greater width than the expansion channels, and bolt and slot connections between the kettle side walls and the supporting beams.

12. A cooking kettle having a bottom and side walls, said side walls having laterally projecting expansion channels extending substantially vertically thereof, supporting beams arranged in proximity to the kettle and having notches to receive the expansion channels, said notches having a greater width than the expansion channels, flanges on the kettle side walls between the channels and adjacent the top of the side walls, and a sliding connection between the flanges and the supporting beams.

13. A cooking kettle having a bottom and side walls, said side walls having laterally projecting expansion channels extending substantially vertically thereof, supporting beams arranged in proximity to the kettle and having notches to receive the expansion channels, said notches having a greater width than the expansion channels, flanges on the kettle side walls between the channels and adjacent the top of the side walls, a sliding connection between the flanges and the supporting beams, and means associated with said beams to engage the side walls of the kettle at points spaced a substantial distance below the flanges.

14. In a cooking kettle having a bottom and side walls, supporting beams arranged in proximity to the kettle side walls, flanges carried by the side walls of the kettle and overlying the supporting beams, said flanges having elongated longitudinally extending slots therein, bolts extending through the slots and engaging the supporting beams, and spacing members surrounding said bolts and arranged in the slots, said spacing members having a thickness greater than the thickness of said flanges.

15. In a cooking kettle having a bottom and side walls, said side walls having expansion channels therein, supporting beams arranged in proximity to the kettle side walls, flanges carried by the side walls of the kettle and overlying the supporting beams, said flanges having elongated longitudinally extending slots therein, bolts extending through the slots and engaging the supporting beams, and spacing members surrounding the bolts and arranged in the slots, said spacing members having a thickness greater than the thickness of the flanges.

16. In a cooking kettle having a bottom and side walls, said side walls having expansion channels therein, supporting beams arranged in proximity to the kettle side walls, flanges carried by the side walls of the kettle and overlying the supporting beams, said flanges having elongated longitudinally extending slots therein, bolts extending through the slots and engaging the supporting beams, and spacing members surrounding the bolts and arranged in the slots, said spacing members having a thickness greater than the thickness of the flanges, and said supporting beams having notches to receive the expansion channels, the notches having a width greater than the width of the expansion channels.

17. A cooking kettle having an elongated generally rectangular form with bottom and side walls, said kettle being adapted to receive a cooking liquid, the side walls of the kettle being provided with expansion joints extending from top to bottom thereof, supporting beams extending longitudinally of the kettle in proximity to the side walls thereof, means rigidly securing the portions of the side walls adjacent one end of the kettle to the supporting beams, and a bolt and slot connection between the supporting beams and side walls adjacent the other end of the kettle.

JOSEPH D. FERRY.